S. FLOERSHEIM.
VEHICLE WHEEL TIRE.
APPLICATION FILED SEPT. 25, 1914.
1,134,188.
Patented Apr. 6, 1915.
2 SHEETS—SHEET 2.
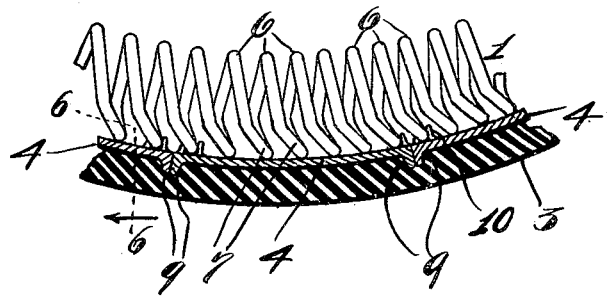
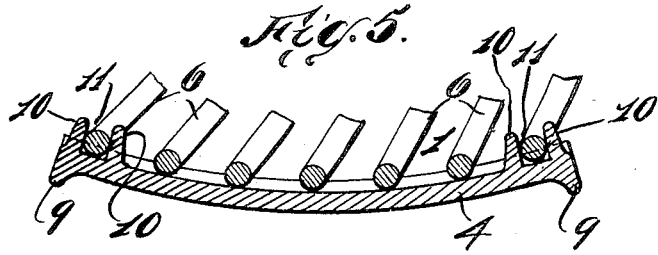
Witnesses
C. A. Jarvis
Edna Nathan
Inventor
Samuel Floersheim
by Maurice Block
attorney.

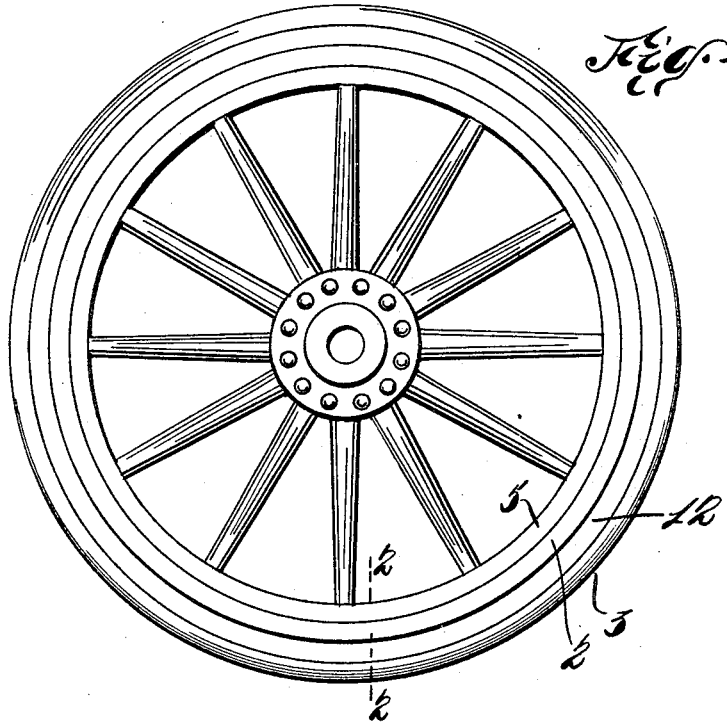
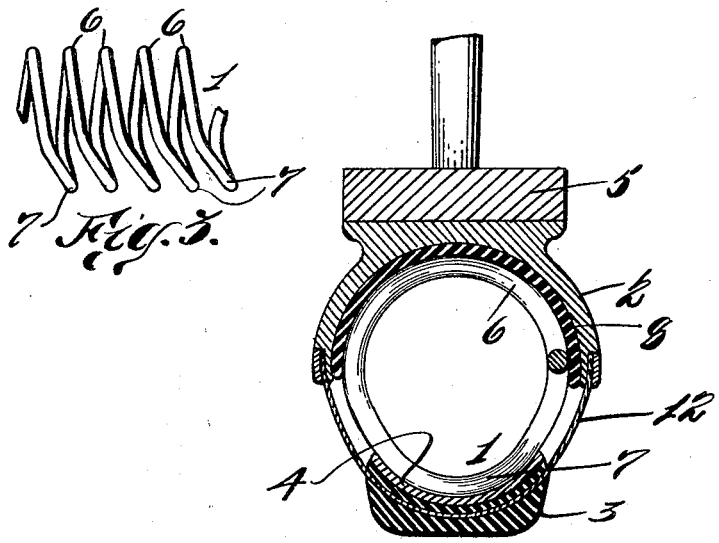

UNITED STATES PATENT OFFICE.

SAMUEL FLOERSHEIM, OF NEW YORK, N. Y.

VEHICLE WHEEL-TIRE.

1,134,188.  Specification of Letters Patent.  Patented Apr. 6, 1915.

Application filed September 25, 1914. Serial No. 863,428.

*To all whom it may concern:*

Be it known that I, SAMUEL FLOERSHEIM, a citizen of the United States of America, residing at the city of New York, borough of Manhattan, county and State of New York, have invented certain new and useful Improvements in Vehicle Wheel-Tires, of which the following is a full, clear, and exact description.

This invention relates to resilient vehicle wheel tires and especially motor vehicle tires of the kind which substitute an inclosed circular helical spring for the more usual pneumatic tube. Spring tires of this general description have been described in divers patents and publications, but have not gone largely into use, probably by reason of various defects found therein.

The object of this invention is to remedy such defects and to make such tires practicable and acceptable.

In particular I make the circular spring especially responsive along its middle line equidistant from its tread side and its inner side in order that it may readily yield forward in line with the axis of said spring, as well as circumferentially toward its center. I also combine with this continuous circular helical spring a circular series of tread plates, individually separable yet bearing end to end against each other, the inner face of each of these plates being freely in contact with several convolutions of the helical spring on the tread side thereof and provided at each end with a pair of lugs, each pair receiving one of the convolutions of said spring and holding it against displacement longitudinally of said spring, the latter being otherwise unattached to any element of the tire.

My invention consists mainly in the improvements above stated; also in certain further details hereinafter more particularly set forth and claimed.

I will now proceed to describe my invention in detail, the novel features of which I will point out in the appended claims, reference being had to the accompanying drawings, forming part hereof, wherein,—

Figure 1 is a side elevation of a wheel embodying my improvements; Fig. 2 is an enlarged cross-sectional detail view, the section being taken on a line 2—2 in Fig. 1; Fig. 3 is a side view of a portion of the improved resilient support which forms part of my improvement; Fig. 4 is an enlarged side view of a portion of the resilient support showing some of the tread-plates and means for securing a tread to the tire; Fig. 5 is an enlarged central sectional view showing the manner of attaching the tread-plates; and Fig. 6 is an enlarged cross-sectional view, the section being taken on a line 6—6 in Fig. 4.

Referring to the drawings, my improved tire consists of a resilient supporting member consisting of a continuous coil spring, which surrounds the wheel and which supports the weight of the vehicle, a support or seat for the spring, a tread portion and tread-plates therefor. The spring or resilient supporting member is indicated by 1, the support or seat therefor by 2, the tread by 3 and the tread-plates by 4. The felly of the wheel, to which the tire is secured, is indicated by 5.

One of the features of my tire is the formation of the resilient support 1 which, as can be seen, consists of a coil spring made up of a plurality of convolutions 6, each convolution having its middle part bent or carried forward out of line with the remainder of the said convolution, the bent portion of each convolution being indicated by 7.

When the weight of the vehicle is imposed upon the member 1 some of the convolutions of the spring will yield circumferentially and owing to the forwardly bent end portions 7 the convolutions 6 will have imparted to them a tendency to give in the direction of the axis of the spring; hence there will be two tendencies to yield, upon the part of the spring 1.

To support the spring 1 I preferably utilize the support of spring-seat 2 which is provided with a yieldable pad 8 against which the spring 1 rests. The pad 8 cushions the shock upon the spring 1. The spring seat 2 is secured in any desirable manner to the felly 5 of the wheel.

A further feature of my invention consists of the tread-plates 4 which are carried by the spring 1, as shown in Figs. 4 and 5. The tread-plates 4 act to support the tread 3 and keep it out of contact with the spring 1, as well as to equalize or distribute the strain upon the spring.

By referring to Figs. 4 and 5 it will be seen that each tread-plate 4 engages the spring at intervals, that is to say, each tread-plate engages two of the convolutions 6, the intermediate convolutions being free; hence the weight imposed upon a tread-plate is distributed throughout a plurality of convolutions 6. The above described engagement of the tread plates with two convolutions of the spring near the ends of such tread plates will effectually prevent the convolutions from crowding up longitudinally of the said helical spring and will therefore maintain approximate equality of efficiency of the latter at all points, but will not bind the convolutions thus held in any other way. There are no lugs in the space between these pairs, hence the intervening convolutions are free to move along the tread plates under pressure in the direction of the axis of said spring, that is to say, toward either of said terminal pairs of lugs. Excepting this holding by the pairs of lugs, all parts of said spring are without attachment to any other part or element of the tire. This free engagement permits automatic adjustment to conditions and pressures without undue binding and increases the efficiency and durability of the spring. It will also be seen, by referring to Fig. 4, that the tread-plates abut at the ends; hence the strain imposed upon the spring to propel the vehicle, will be conveyed from one plate to another until there will be enough tension to equalize the tractive force expended. To distribute wear, I preferably enlarge the tread-plates at their ends, the said enlargements or shoulders 9 also acting to keep the tread 4 from slipping or creeping. To engage the spring, I provide each tread-plate 4 with lugs 10 spaced to form a pocket or jaw 11 to receive a spring-convolution 6.

The tread plates abutting end to end as above stated obviously constitute an annular sectional band or circular sectional tread plate interposed between the circular tread 3 and the peripheral face of said spring. It is best that the latter should be continuous, for more effective action, but there are advantages in having said annular tread plate made in separable sections; inasmuch as each individual section or tread plate may be individually withdrawn for repair or to replace or readjust the engagement of these plates with the convolutions of the spring; also the individual insertion of these plates in assembling the elements of the tire is much easier than the introduction of a continuous annular plate.

To protect the spring 1 from dampness, etc., I preferably employ an apron 12 which in this instance is carried by the tread 3 and secured, at its ends, to the spring-seat 2.

Having now described my invention, what I claim and desire to secure by Letters Patent, is—

A vehicle tire comprising a continuous circular helical spring adapted to be fitted peripherally around a wheel, a tread and an annular series of independent tread plates interposed between said tread and said spring, said tread plates being arranged continuously end to end, each plate of the series being provided at each end with an inwardly presented pair of lugs receiving a convolution of said spring between them but allowing free movement along the axis of the spring of the convolutions in the space between said pairs of lugs, the spring being otherwise unattached to any part.

Signed at New York city, N. Y. this 23d day of September, 1914.

SAMUEL FLOERSHEIM.

Witnesses:
  MAURICE BLOCK,
  EDWARD A. JARVIS.

Copies of this patent may be obtained for five cents each, by addressing the "Commissioner of Patents, Washington, D. C."